United States Patent
Mineyama

(10) Patent No.: US 7,082,613 B1
(45) Date of Patent: Jul. 25, 2006

(54) RECEIVER FOR FACILITATING THE VIEWING OF PROGRAMS BY A USER

(75) Inventor: Toru Mineyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/577,922

(22) Filed: May 24, 2000

(30) Foreign Application Priority Data

May 26, 1999 (JP) ............................. 11-146710

(51) Int. Cl.
*G06F 13/00* (2006.01)
*G06F 3/00* (2006.01)
*H04N 5/445* (2006.01)
*H04N 7/173* (2006.01)

(52) U.S. Cl. ..................... 725/46; 725/44; 725/47; 725/95

(58) Field of Classification Search ............ 725/46–47, 725/44, 95
See application file for complete search history.

(56) References Cited

U.S. PATENT DOCUMENTS

| 5,534,911 A | 7/1996 | Levitan |
| 5,758,257 A * | 5/1998 | Herz et al. ................... 725/116 |
| 6,486,920 B1 * | 11/2002 | Arai et al. ................... 348/563 |
| 6,542,514 B1 * | 4/2003 | Yamada ....................... 370/432 |
| 6,564,381 B1 * | 5/2003 | Hodge et al. .................. 725/97 |
| 2002/0054752 A1 * | 5/2002 | Wood et al. ................... 725/46 |

FOREIGN PATENT DOCUMENTS

| GB | 2 343 075 | 4/2000 |
| GB | 2 343 076 | 4/2000 |
| WO | WO 00/40012 | 7/2000 |
| WO | WO 00/40021 | 7/2000 |
| WO | WO 00/40025 | 7/2000 |
| WO | WO 00/40028 | 7/2000 |

* cited by examiner

*Primary Examiner*—John Miller
*Assistant Examiner*—Michael W. Hoye
(74) *Attorney, Agent, or Firm*—Finnegan, Henderson, Farabow, Garrett & Dunner, L.L.P.

(57) ABSTRACT

A tuner may select a predetermined real channel from a plurality of real channels, and may obtain a broadcast signal of this selected real channel. A program information extracting section may extract program information (IPG) of a plurality of real channels from this broadcast signal. A controller may create a user profile in which information of programs received at every unit time of a day were accumulated as user profile information by using the program information (IPG). Further, the controller may create a virtual channel guide in which programs of a plurality of real channels are located selectively by using this user profile.

9 Claims, 13 Drawing Sheets

|  | V-ch1 | V-ch2 | V-ch3 | V-ch4 | V-ch5 | V-ch6 |
|---|---|---|---|---|---|---|
| 20:00:00 | | | | | | |
| 21:00:00 | MOVIE 2 | MOVIE 3 | MOVIE 1 | NEWS 2 | DRAMA 3 | DRAMA 6 |
| 22:00:00 | | DRAMA 5 | DRAMA 4 | MOVIE 4 | NEWS 1 | NEWS 5 |
| 23:00:00 | NEWS 4 | SPORTS 1 | SPORTS 3 | | NEWS 3 | |
| 00:00:00 | | | | | | |

| CATEGORY LIST | (CATEGORY ID = 1, PREFERENCE DEGREE = 8) |
| | (CATEGORY ID = 3, PREFERENCE DEGREE = 7) |
| TITLE LIST | (TITLE = NEWS A, PREFERENCE DEGREE = 8) |
| | (TITLE = ○○ MOVIE THEATER, PREFERENCE DEGREE = 7) |
| KEY WORD LIST | (KEY WORD = NAKAI ××, PREFERENCE DEGREE = 8) |
| | (KEY WORD = SUDOU ××, PREFERENCE DEGREE = 7) |

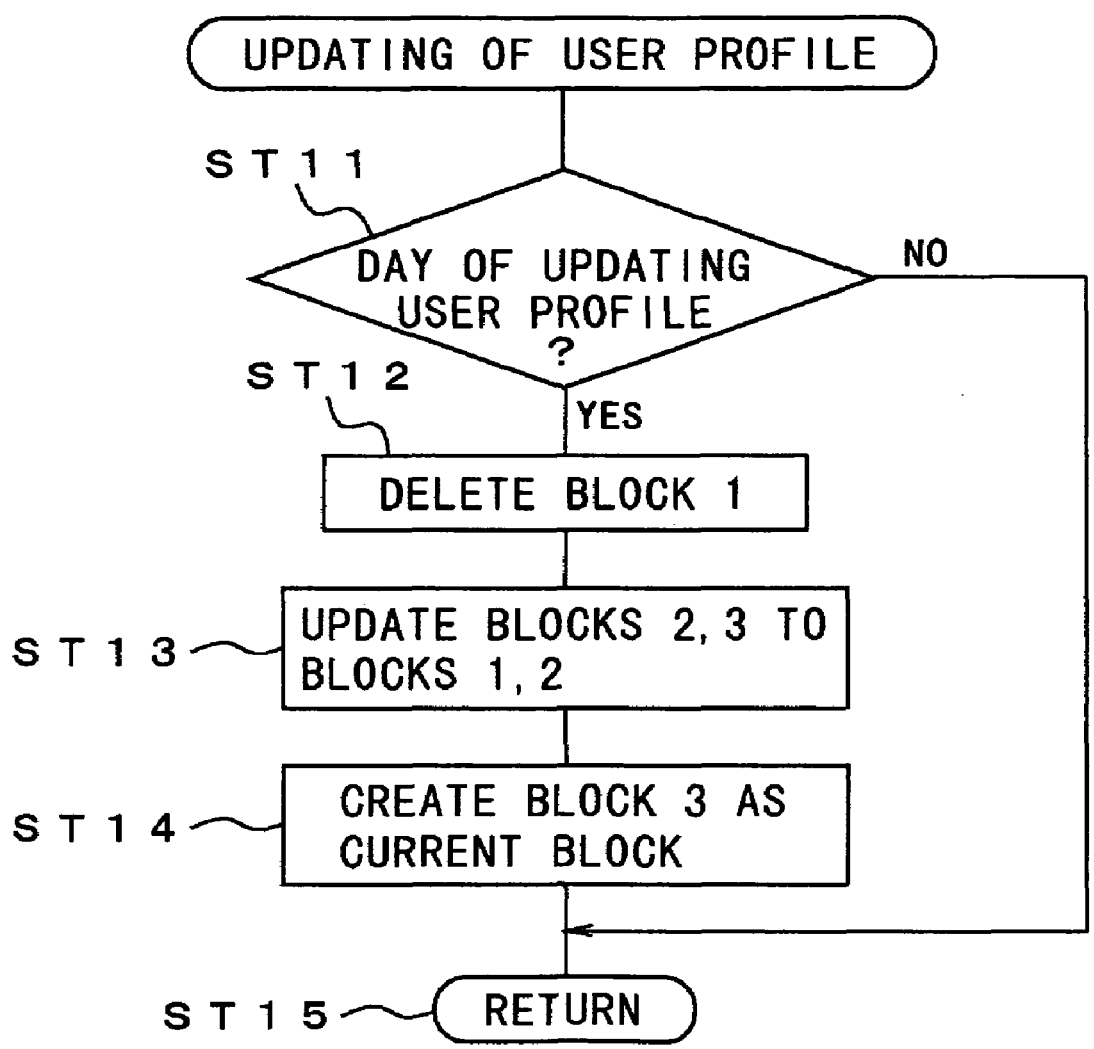

FIG. 12

| Time | CHa | CHb | CHc | CHd | CHe | CHf | CHg | CHh |
|---|---|---|---|---|---|---|---|---|
| 20:00:00 | MOVIE 1 | HISTORICAL PLAY 1 | QUIZ 1 | DRAMA 2 | SPORTS 2 | HISTORICAL PLAY 2 | ANIMATION 1 | MOVIE 3 |
| 21:00:00 | | NEWS 2 | COOKING 2 | DRAMA 3 | DOCUMENTARY 1 | DRAMA 6 | MOVIE 2 | |
| 22:00:00 | NEWS 1 | DRAMA 1 | COMEDY 1 | DRAMA 4 | DRAMA 5 | NEWS 5 | | MOVIE 4 |
| 23:00:00 | CONCERT 1 | VARIETY SHOW 1 | SPORTS 1 | NEWS 3 | NEWS 4 | SPORTS 3 | NEWS 6 | |
| 00:00:00 | | | | | | | | |

FIG. 13

| | 20:00:00 | 21:00:00 | 22:00:00 | 23:00:00 | 00:00:00 |
|---|---|---|---|---|---|
| V-ch1 | | MOVIE 2 | | NEWS 4 | |
| V-ch2 | MOVIE 3 | | DRAMA 5 | SPORTS 1 | |
| V-ch3 | MOVIE 1 | | DRAMA 4 | | SPORTS 3 |
| V-ch4 | | | NEWS 2 | MOVIE 4 | |
| V-ch5 | | DRAMA 3 | | NEWS 1 | NEWS 3 |
| V-ch6 | | DRAMA 6 | | NEWS 5 | |

RECEIVER FOR FACILITATING THE VIEWING OF PROGRAMS BY A USER

BACKGROUND OF THE INVENTION

1. Field of the Invention

This invention relates to a receiver for use in a television receiver for receiving a digital broadcast signal or the like, for example. More particularly, this invention relates to a television receiver which can be made easy to handle by creating a virtual channel in which programs of a plurality of real channels are located selectively on the basis of a user profile in which information of programs received at every unit time is accumulated as user profile information.

2. Description of the Related Art

When a viewing of a program at a television receiver is considered, it is known that a user usually views programs along a certain pattern. For example, a user may view a weather forecast and an information program in the morning and may view a variety show and a drama in the night.

A user generally switches real channels in accordance with the above-mentioned program viewing pattern. Here, the real channel may be a channel in which a television station are broadcasting programs. One television station may occupy one channel. In this case, such a channel may be an ideal channel in which programs corresponding to a user's viewing pattern are located. In that case, a user need not switch channels.

SUMMARY OF THE INVENTION

It is an object of this invention to provide a receiver in which a user becomes able to view programs in accordance with a viewing pattern without a channel switching operation.

According to an aspect of the present invention, there is provided a receiver which is comprised of a receiving means for selecting a predetermined real channel from a plurality of real channels and obtaining a broadcast signal of the selected real channel, a program information extracting means for extracting program information of a plurality of real channels from the broadcast signal obtained by the receiving means, a user profile creating means for creating on the basis of the real channel selected information in the receiving means and the program information extracted by the program information extracting means a user profile in which program information received at every unit time of a day are accumulated as user profile information, and a virtual channel creating means for creating on the basis of the user profile created by the user profile creating means and the program information extracted by the program extracting means a virtual channel in which programs of a plurality of real channels are selectively located.

According to this invention, program information of a plurality of real channels may be extracted from the broadcast signal obtained at the receiving means. A received program may be specified on the basis of this program information and real channel selection information in the receiving means. There may be created a user profile in which program information received at every unit time of a day is accumulated as user profile information. In this case, a day may be divided equally or may be divided unequally in response to the viewing frequency. This user profile may indicate a user viewing pattern.

A virtual channel in which programs of a plurality of real channels are located selectively may be created on the basis of the user profile and the program information of a plurality of real channels. This virtual channel may be a channel in which programs corresponding to a user's viewing pattern may be located. Therefore, by selecting this virtual channel, it becomes possible for a user to view the program corresponding to the viewing pattern without switching channels. Thus, a receiver becomes easier for a user to handle.

BRIEF DESCRIPTION OF THE DRAWINGS

FIG. 9 is a flowchart showing the manner in which a user profile is updated;

FIG. 12 is a diagram showing examples of programs of real channels; and

FIG. 13 is a diagram showing an example of a manner in which virtual channels are created.

DESCRIPTION OF THE PREFERRED EMBODIMENT

Figure 1:
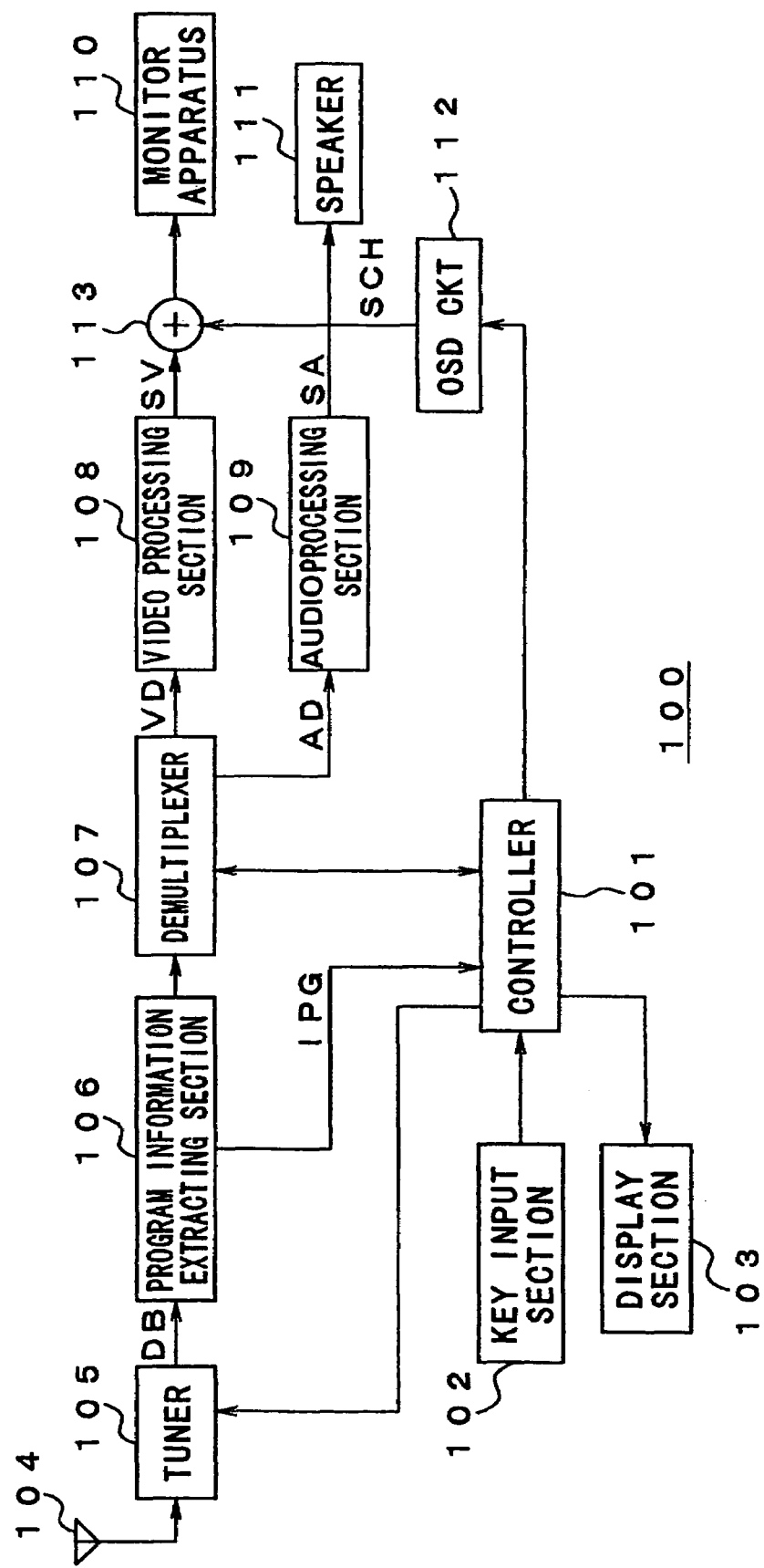
FIG. 1 is a block diagram showing an arrangement of a television receiver according to an embodiment of the present invention.

An embodiment according to this invention will be described below with reference to the drawings. FIG. 1 of the accompanying drawings is a block diagram showing an arrangement of a television receiver 100 according to an embodiment. This television receiver 100 may be a receiver for receiving a digital broadcast signal.

This television receiver 100 may include a controller 101 having a microcomputer, not shown, for controlling an operation of the whole of the receiver. This controller 101 may have connected thereto a key input section 102 for accepting a user's operation such as a channel-selection and a display section 103 for displaying thereon the operation state or the like. The display section 103 may be comprised of a liquid-crystal display device or the like, for example.

Also, the television receiver 100 may include an antenna 104 for receiving a digital broadcast signal from a satellite or a terrestrial station, not shown, and a tuner 105 in which a broadcast signal of a predetermined real channel may be obtained from a digital broadcast signal of a plurality of real channels received at this antenna 104 and which may output broadcast data DB by effecting a demodulation processing and an error-correction processing on the digital broadcast signal. This broadcast signal DB may be an MPEG2 (Moving Picture Experts Group 2) transport stream, for example.

The channel-selection operation made by the tuner 105 may be based on the user's operation of the key input section 102, and may be controlled by the controller 101. For example, when a user selects a predetermined real channel as a selected channel, under control of the controller, the tuner may output only the broadcast signal of such predetermined real channel. Also, when a user selects a virtual channel, which will be described later on, as a selected channel, under control of the controller, the tuner 105 may sequentially output broadcast signals of real channels corresponding to programs in such a manner that the programs comprising the virtual channel may be received sequentially. Here, the virtual channel may comprise programs of a plurality of real channels located selectively.

Also, the television receiver 100 may include a program information extracting section 106 for extracting program information IPG of a plurality of real channels from the broadcast data DB obtained at the tuner 105. The program information IPG may be an electronic program guide (EPG: Electronic Program Guide), for example, and may have information such as a title, a category, a key word, a broadcast start time, a broadcast end time and a broadcast time in response to each program. This program information IPG may be supplied to the controller 101, in which it may be used to display the programs of a plurality of real channels and to create a user profile, which will be described later on, and a virtual channel.

Also, the television receiver 100 may include a demultiplexer 107 for demultiplexing the broadcast data DB obtained at the tuner 105 to provide video data VD and audio data AD, a video processing section 108 for outputting a video signal SV by effecting a processing such as a data expansion processing on the video data VD separated from the broadcast data DB and an audio processing section 109 for outputting an audio signal SA by effecting a processing such as a data expansion on the audio data AD separated from the broadcast data DB.

Also, the television receiver 100 may include a monitor apparatus 110 for displaying an image based on the video signal SV obtained at the video processing section 108 and a speaker 111 for outputting sounds based on the audio signal SA obtained from the audio processing section 109. The monitor apparatus 110 may be a CRT (cathode-ray tube) display or a flat panel display such as an LCD (liquid crystal display), for example.

Also, the television receiver 100 may include an OSD (On Screen Display) circuit 112 for generating a character display signal SCH to display characters on the screen and a synthesizer 113 for synthesizing the character display signal SCH to the video signal SV from the above-mentioned video signal processing section 108 and for supply a resultant signal to the monitor apparatus 110.

The manner in which the OSD circuit 112 may generate the character display signal SCH may be controlled by display data supplied from the controller 101. For example, when a display of programs of a plurality of real channels is instructed by a user's operation of the key input section 102, display data for displaying such programs may be supplied from the controller 101 to the OSD circuit 112. Also, when the creation of the virtual channel is instructed by a user's operation of the key input section 102, display data for displaying the program of the created virtual channel may be supplied from the controller 101 to the OSD circuit 112.

Also, when the display of the program of the virtual channel that was already created is instructed by a user's operation of the key input section 102, display data for displaying such program may be supplied from the controller 101 to the OSD circuit 112. Further, when the display of a user profile is instructed by a user's operation of the key input section 102, display data for displaying such user profile may be supplied from the controller 101 to the OSD circuit 112.

An operation of the television receiver 100 shown in FIG. 1 will be described next. The tuner 105 may output a digital broadcast signal of a predetermined real channel from digital broadcast signals of a plurality of real channels received at the antenna 104, and further may output the broadcast data DB by effecting a demodulation processing and an error-correction processing on the digital broadcast signal.

In this case, when a predetermined real channel is selected by a user's operation of the key input section 102 as a selected channel, under control of the controller 101, the tuner 105 may continuously output only the digital broadcast signal of such real channel. Also, when a predetermined virtual channel is selected by user's operation of the key input section 102 as a selected channel, under control of the controller 101, the tuner 105 may sequentially output broadcast signals of real channels corresponding to programs comprising such virtual channel.

The broadcast data DB outputted from the tuner 105 may be supplied to the program information extracting section 106. Then, this program information extracting section 106 may extract the above-mentioned program information IPG of a plurality of real channels from the broadcast data DB. The program information IPG thus extracted may be supplied to the controller 101. This controller 101 may use this program information IPG to create a user profile, create a virtual channel and further to create display data for displaying the program of the real channel.

Also, the broadcast data DB outputted from the tuner 105 may be supplied through the program information extracting section 106 to the demultiplexer 107. Then, this demultiplexer 107 may demultiplex the broadcast data DB to provide the video data and the audio data AD. Then, the video processing section 108 may generate the video signal SV by effecting a processing such as a data expansion on the video data VD thus demultiplexed. Also, the audio processing section 109 may generate the audio signal SA by effecting a processing such as a data expansion on the audio data AD thus demultiplexed.

The video signal SV generated from the video processing section 108 may be supplied through the synthesizer 113 to the monitor apparatus 110, whereby an image concerning the broadcast data DB outputted from the tuner 105 may be displayed on the screen of the monitor apparatus 110. Also, the audio signal SA generated from the audio processing section 109 may be supplied to the speaker 111, whereby sounds concerning the broadcast data DB outputted from the tuner 105 may be emanated from the speaker 111.

Also, when the display of the program of the real channel and the display of the program of the virtual channel, etc. may be instructed by a user's operation of the key input section 102, the display data for such display may be supplied from the controller 101 to the OSD 112, and this OSD circuit 112 may generate the character display signal SCH based on the display data. This character display signal SCH may be supplied to the synthesizer 113, in which it may be synthesized with the video signal SV from the video processing section 108 and then supplied to the monitor apparatus 110. Thus, characters of the program of the real channel and the program of the virtual channel, etc. may be displayed on the screen of the monitor apparatus 110.

The manner in which a user profile is created under control of the controller 101 will be described next.

Figure 2:
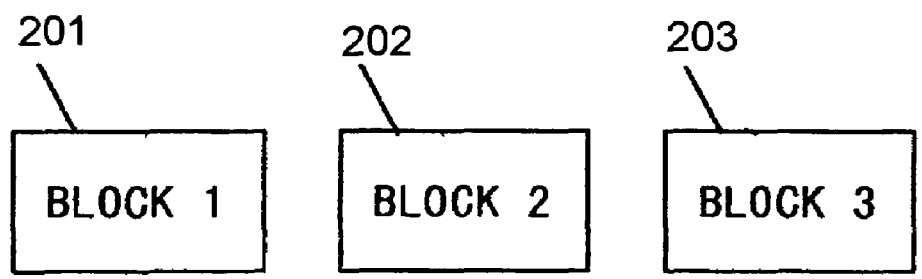
FIG. 2 is a diagram showing user profile forming areas within a memory.
Figure 3:
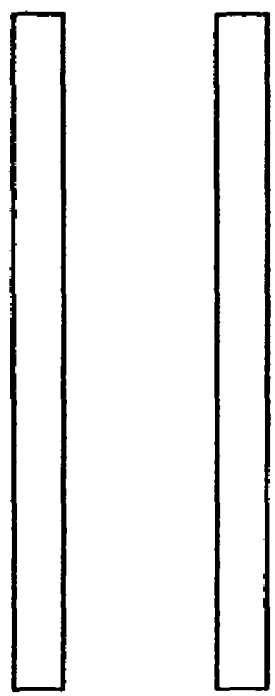
FIG. 3 is a diagram showing arrangements of a weekday block and a holiday block comprising blocks serving as user profile forming areas.

User profiles may be created in a plurality of blocks (memory areas). In this embodiment, as shown in FIG. 2, user profiles may be created in blocks 1 to 3. Each of the blocks 1 to 3 has formed therein a user block file of two months. These blocks 1 to 3 may be formed within a memory (not shown) incorporated in the controller 101. Also, as shown in FIG. 3, each of the blocks 1 to 3 may comprise a weekday block and a holiday block. A user profile accumulated in the weekday block may be created from a viewing history of programs on weekdays, and a user profile accumulated in the holiday block may be created from a viewing history of programs on holidays.

Figure 4:
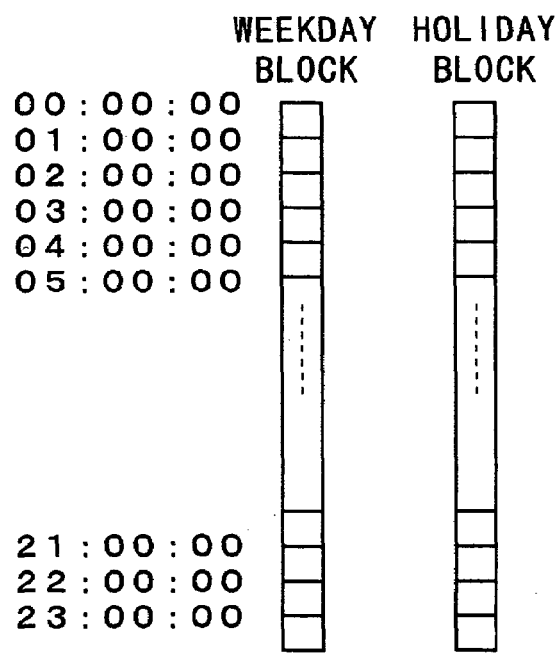
FIG. 4 is a diagram showing an example of a manner in which the weekday block and a holiday block are divided (equally)
Figure 5:
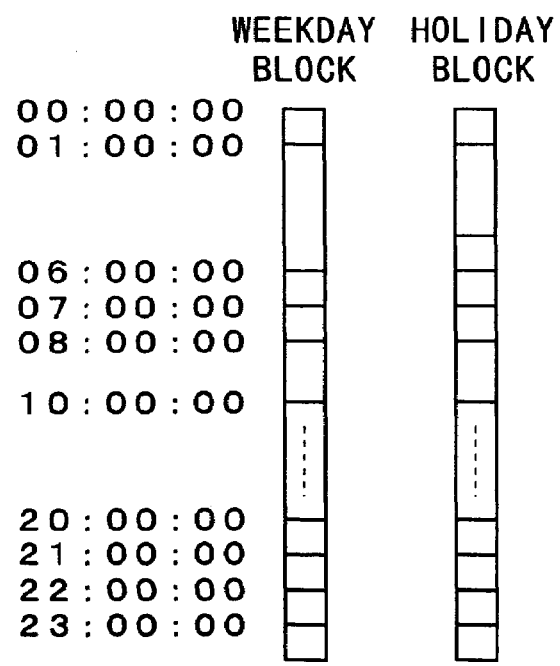
FIG. 5 is a diagram showing an example of a manner in which the weekday block and the holiday block are divided (unequally)
Figures 6, 7:
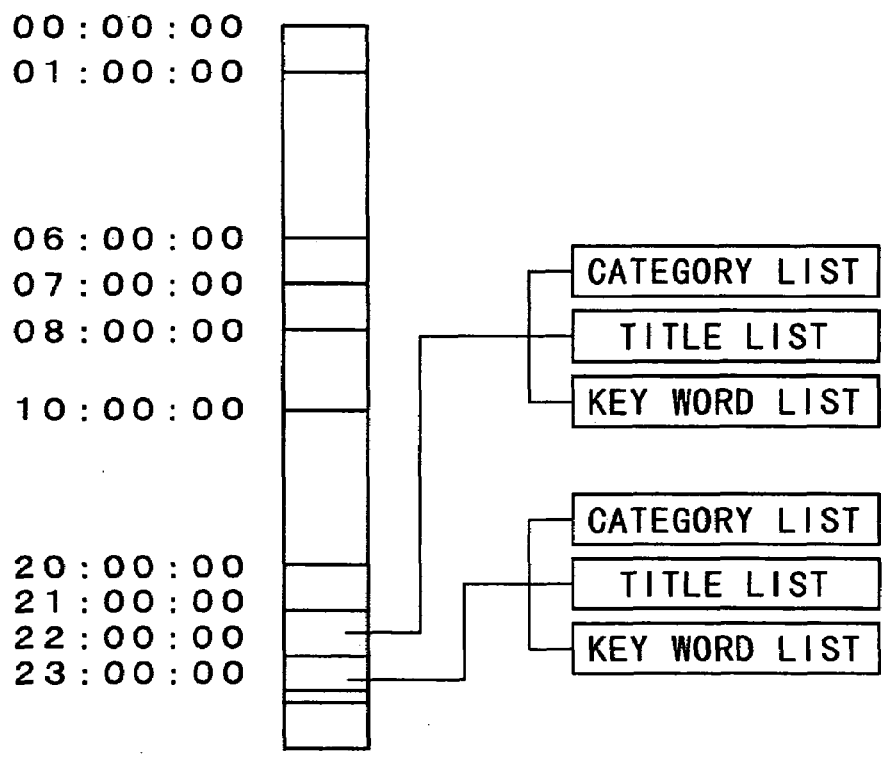
FIG. 6 is a diagram to which reference will be made in explaining an arrangement of user profile information of every unit time.
FIG. 7 is a diagram showing examples of a category list, a title list and a key word list comprising user profile information.

Each of the weekday block and the holiday block may be divided by a predetermined unit time, and user profile information may be accumulated in each unit time area. For example, when the weekday block and the holiday block may be divided by an equal time, e.g. one-hour unit as shown in FIG. 4. Also, for example, the weekday block and the holiday block may be divided by unequal times depending upon a viewing frequency as shown in FIG. 5. That is, the unit time may be decreased in a time zone in which the viewing frequency is high. On the contrary, the time unit may be increased in a time zone in which the viewing frequency is low The user profile information accumulated in every unit time area may comprise a category list, a title list and a key word list as shown in FIG. 6. Then, as shown in FIG. 7, the category list may comprise a category of a program viewed at the unit time and its preference degree, the title list may comprise a title of a program viewed at the unit time and its preference degree, and further the key word list may comprise a key word such as performers contained in the program viewed at the unit time and its preference degree. When a certain program is viewed during the unit time, if the items of the category, the title and the key word of such program exist on the list, then the count of the preference degree may be incremented by one. If on the other hand the items of the category, the title and the key word of such program do not exist on the list, then such items may be added, and the count of the preference degree may be set to 1.

The manner in which user profile information may be accumulated under control of the controller 101 will be further described with reference to a flowchart of FIG. 8. The flowchart of FIG. 8 will be executed when the viewing of a certain program is ended. The viewing of the program may be completed when a power supply switch is turned off or a channel is changed.

Here, it may be hard to regard a program which was received during a very short period of time in accordance with the switching operation of the channel as a program that is viewed by a user in actual practice. Hence, such program should be excluded from the viewed program. Accordingly, initially, it is determined at a step ST1 whether or not a program viewing time Ton is greater than a threshold value Tth. If an inequality of Ton> is not satisfied, then control goes to a step ST6, whereat a user profile information accumulation operation is ended. If the inequality of Ton>Tth is satisfied, then control goes to a step ST2. In the step ST2, user profile information is read out from the unit time area of a current block corresponding to the program viewing time. In this case, when a program to be viewed is a weekday program, the weekday block may be used. When on the other hand a program to be viewed is a holiday program, the holiday block may be used.

In the next step ST3, a category, a title and a key word of the viewed program may be outputted from the program information IPG extracted by the program information extracting section 106. Then, in a step ST4, it is determined whether or not the items of the category, the title and the key word outputted at the step ST3 exist on a category list, a title list and a key word list of the user profile information read out at the step ST2. If such items exist on the category list, the title list and the key word list, then the count of the preference degree may be incremented by one. If not, then such item may be added, and the preference degree may be set to 1.

Then, at a step ST5, user profile information changed at the step ST4 may be written in the unit time area of the current block corresponding to the program viewing time. Thereafter, control goes to the step ST6, whereat the user profile information accumulation operation is ended.

Figure 8:
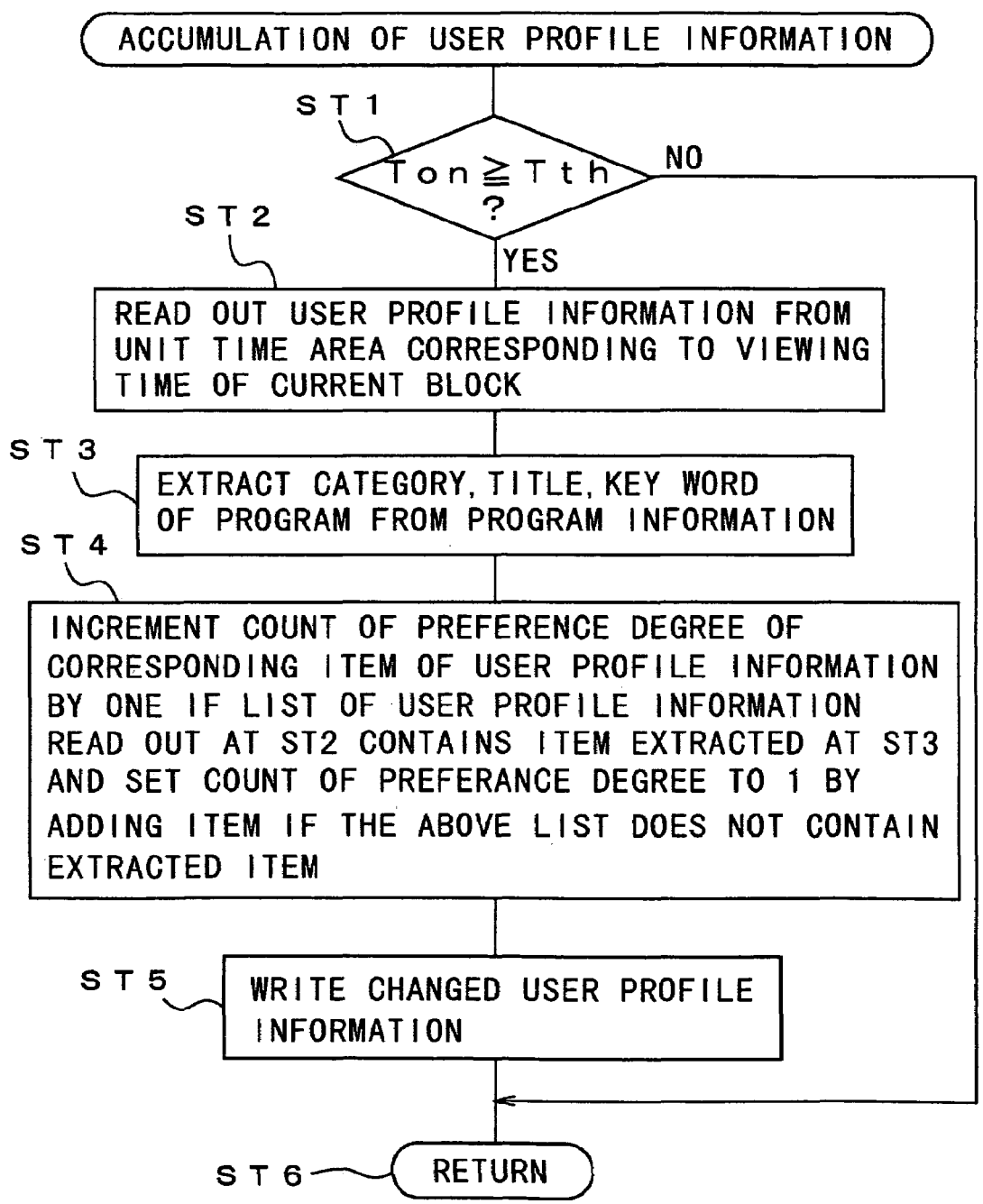
FIG. 8 is a flowchart showing the manner in which user profile information is accumulated.

By the user profile information accumulation operation shown in the flowchart of FIG. 8, the information (category, title, key word) of the program viewed by the user may be sequentially accumulated as user profile information of the unit time corresponding to the viewing time of the program of the current block.

As described above, the user profile may be accumulated in three blocks 1 to 3 identified as 201 to 203 in FIG. 2. In this case, the oldest user file may be discarded every two months, and the user profile may be updated. The manner in which a user profile may be updated under control of the controller 101 will be described with reference to a flowchart of FIG. 9. The flowchart of FIG. 9 may be executed at every constant time. Incidentally, although not shown, the controller 101 may include a clock circuit (not shown) for obtaining date and time information.

Initially, it is determined at a step ST11 whether or not a certain day of two months later is a day in which a user profile should be updated. If it is determined that a certain day is not such day, then control goes to a step ST15, whereat the user profile update operation may be ended. If it is determined that a certain day is such day, then control goes to a step ST12. At the step ST12, the block 1 may be deleted.

Then, at a step ST13, the blocks 2, 3 may be updated to the blocks 1, 2. Then, at a step ST14, a new block 3 may be created and used as a current block. Thereafter, control goes to a step ST15, whereat the updating operation of the user profile may be ended.

The virtual channel may be created by effectively utilizing the user profile thus created. This virtual channel may be created when a user may instruct the creation of the virtual channel by operating the key input section 102. Flowcharts of FIGS. 10A to 10D show the manner in which the virtual channel is created under control of the controller 101. Although not described, the user can set the number of channels of the virtual channel by operating the key input section 102.

Figure 10A:
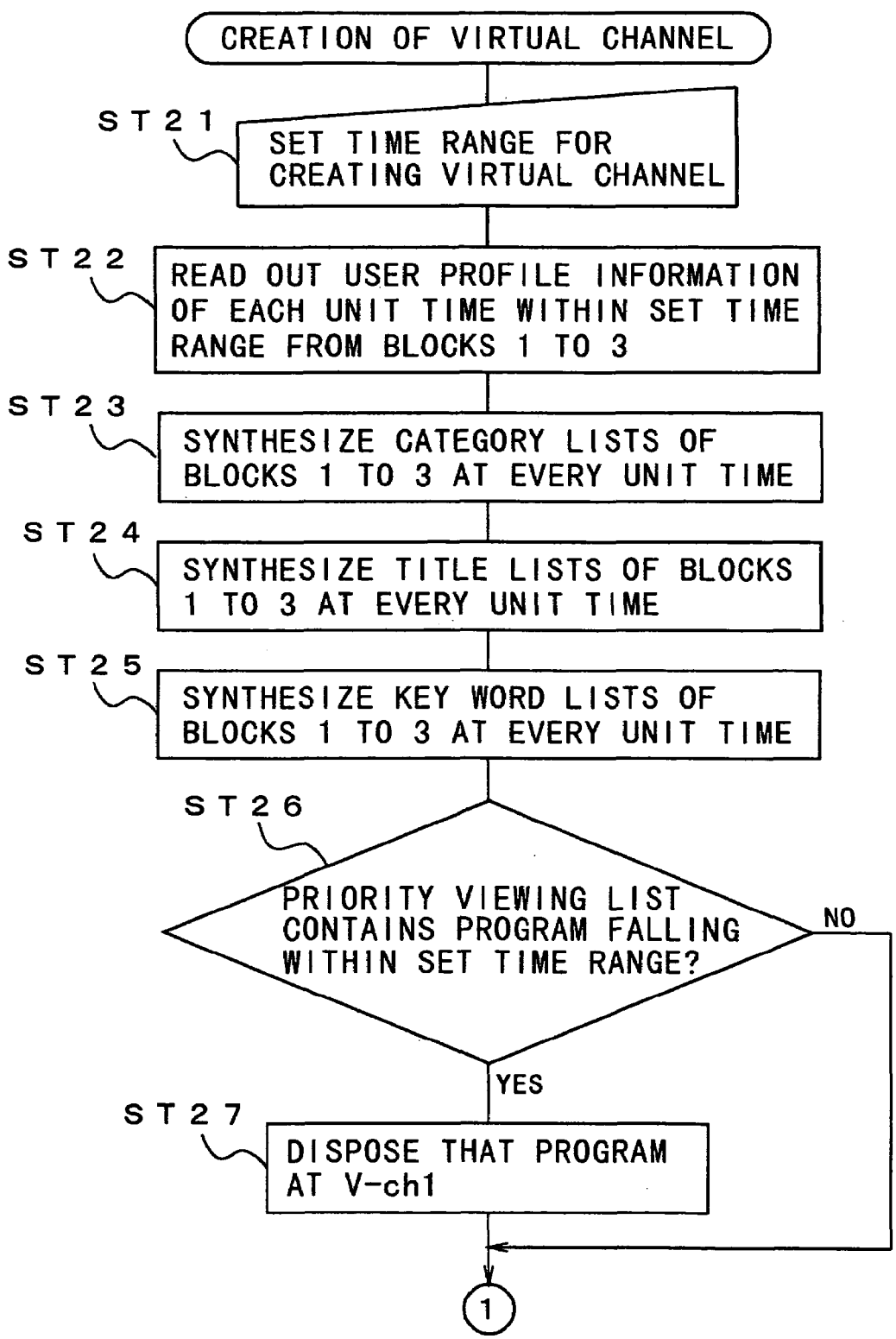
FIG. 10 (formed of FIGS. 10A, 10B, 10C and 10D drawn on four sheets of drawings so as to permit the use of a suitably large scale) is a flowchart showing the manner in which a virtual channel is created.
Figure 11:
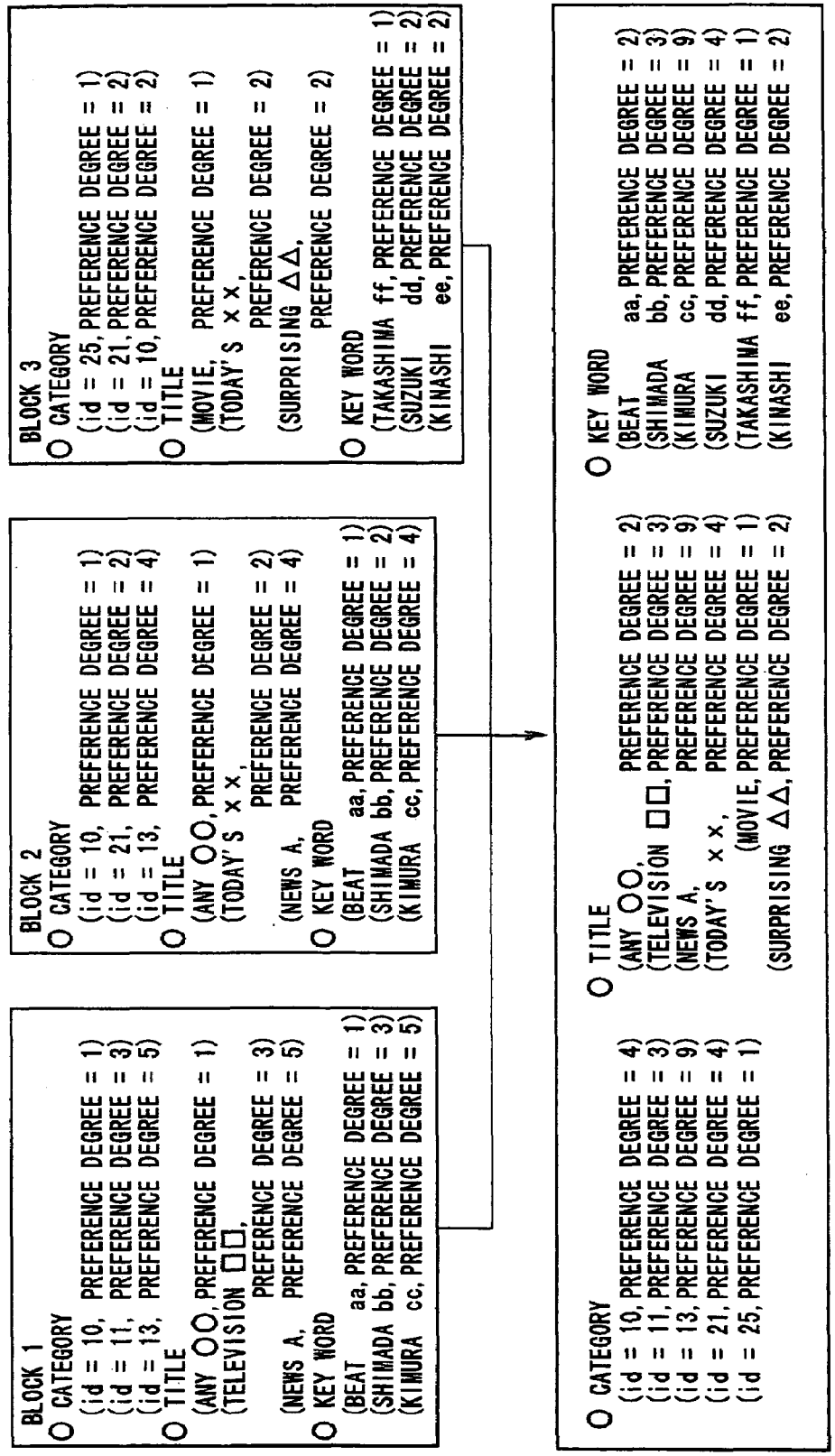
FIG. 11 is a diagram showing an example of a manner in which synthesized user profile information is created.

Initially, at a step ST21 of FIG. 10A, when the user may set a time range of creating a virtual channel by operating the key input section 102, then control goes to a step ST22, whereat user profile information of at every unit time within the set time range may be read out from the blocks 1 to 3. Then, at steps ST23 to ST25, category lists, title lists and key word lists of the respective blocks 1 to 3 may be synthesized at every unit time, thereby resulting in synthesized user profile information being created. In this case, when the same items may be synthesized, an added value, a maximum value and a weighted mean value, for example, may be used as a synthesized value of a preference degree. When the weighted mean value may be used, a weighting coefficient may increase on the current block side, for example. FIG. 11 shows an example of the manner in which synthesized user profile information may be created. In this example, an added value may be used as the synthesized value of the preference degree.

Figure 10B:
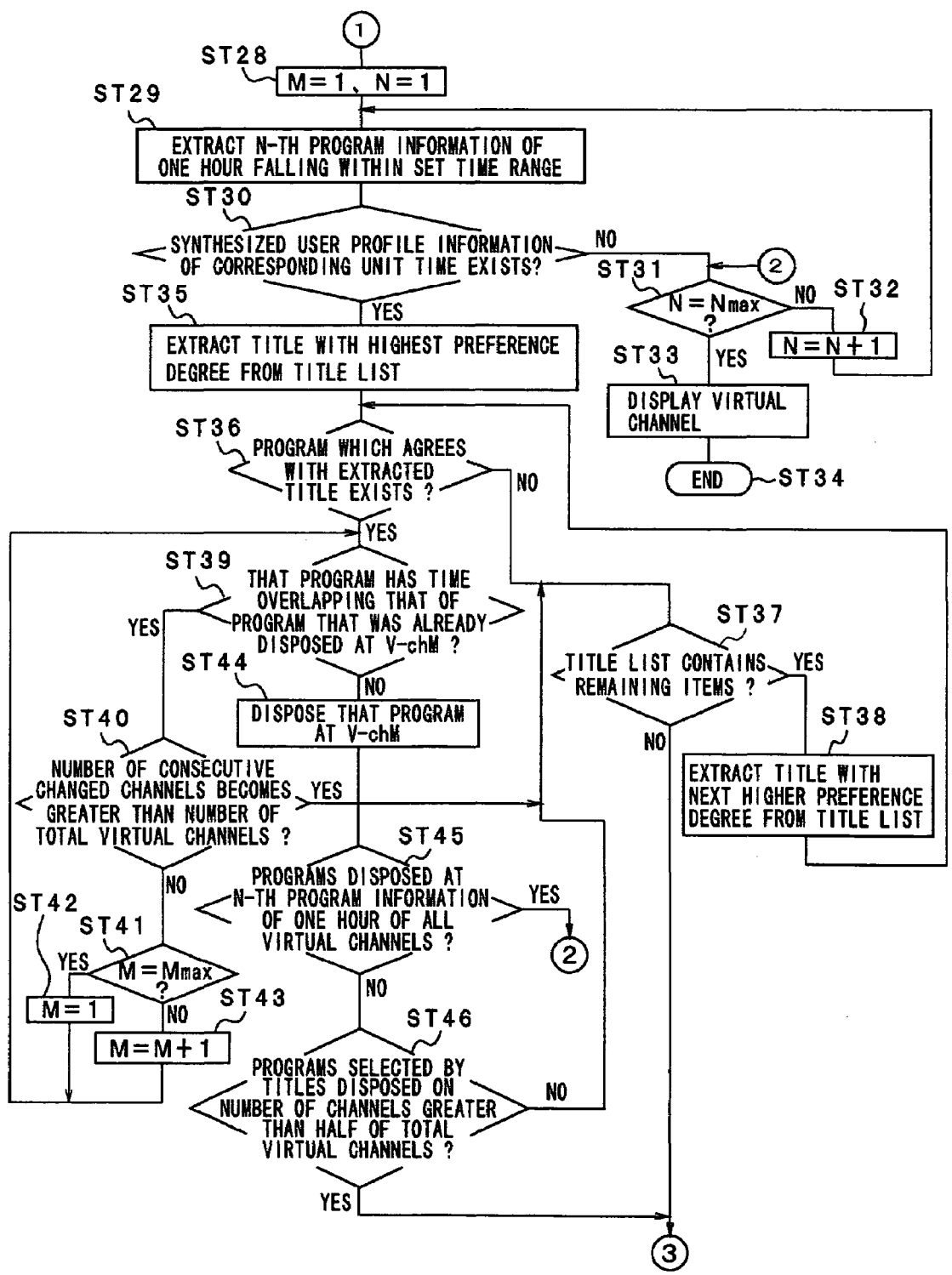
Figure 10C:
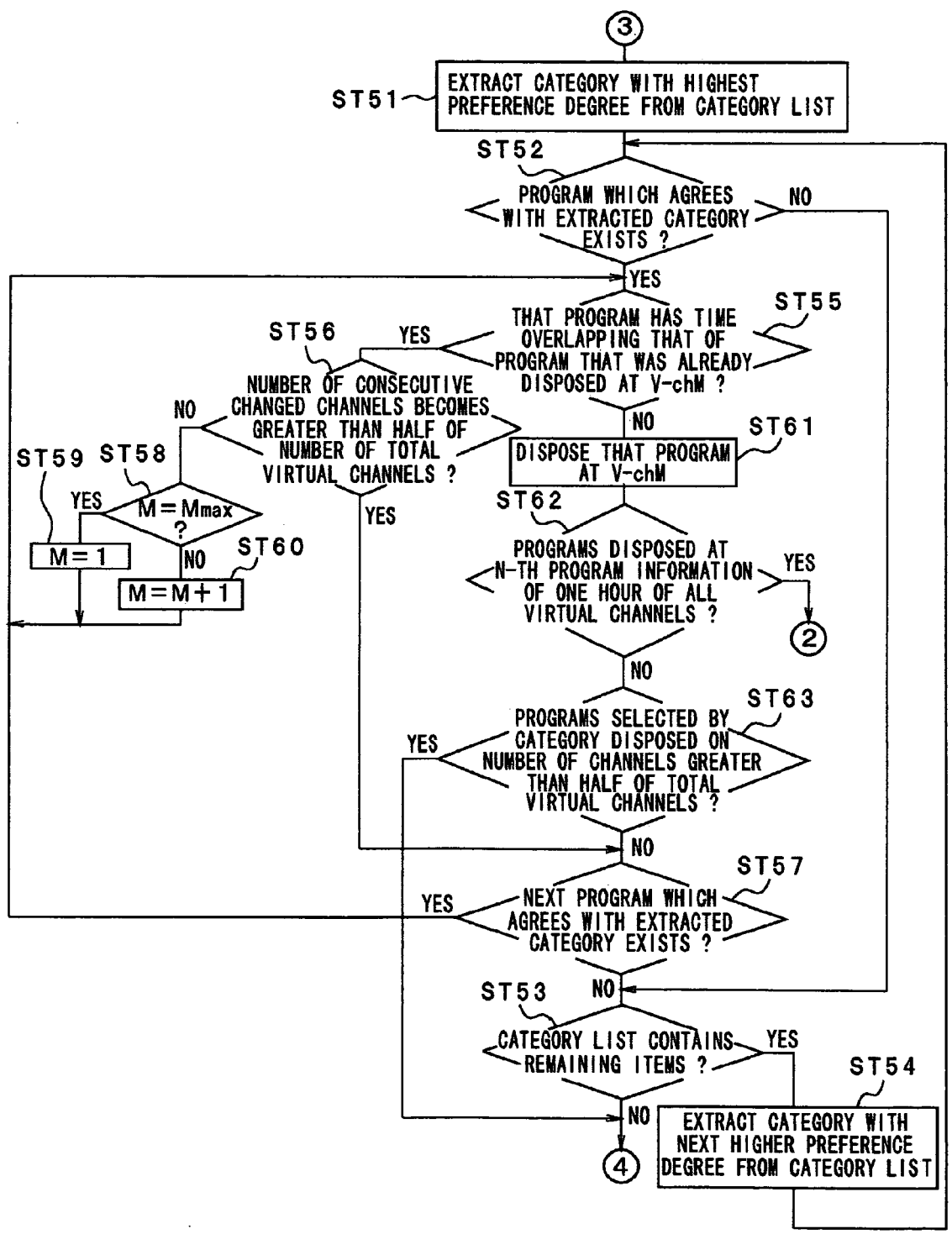
Figure 10D:
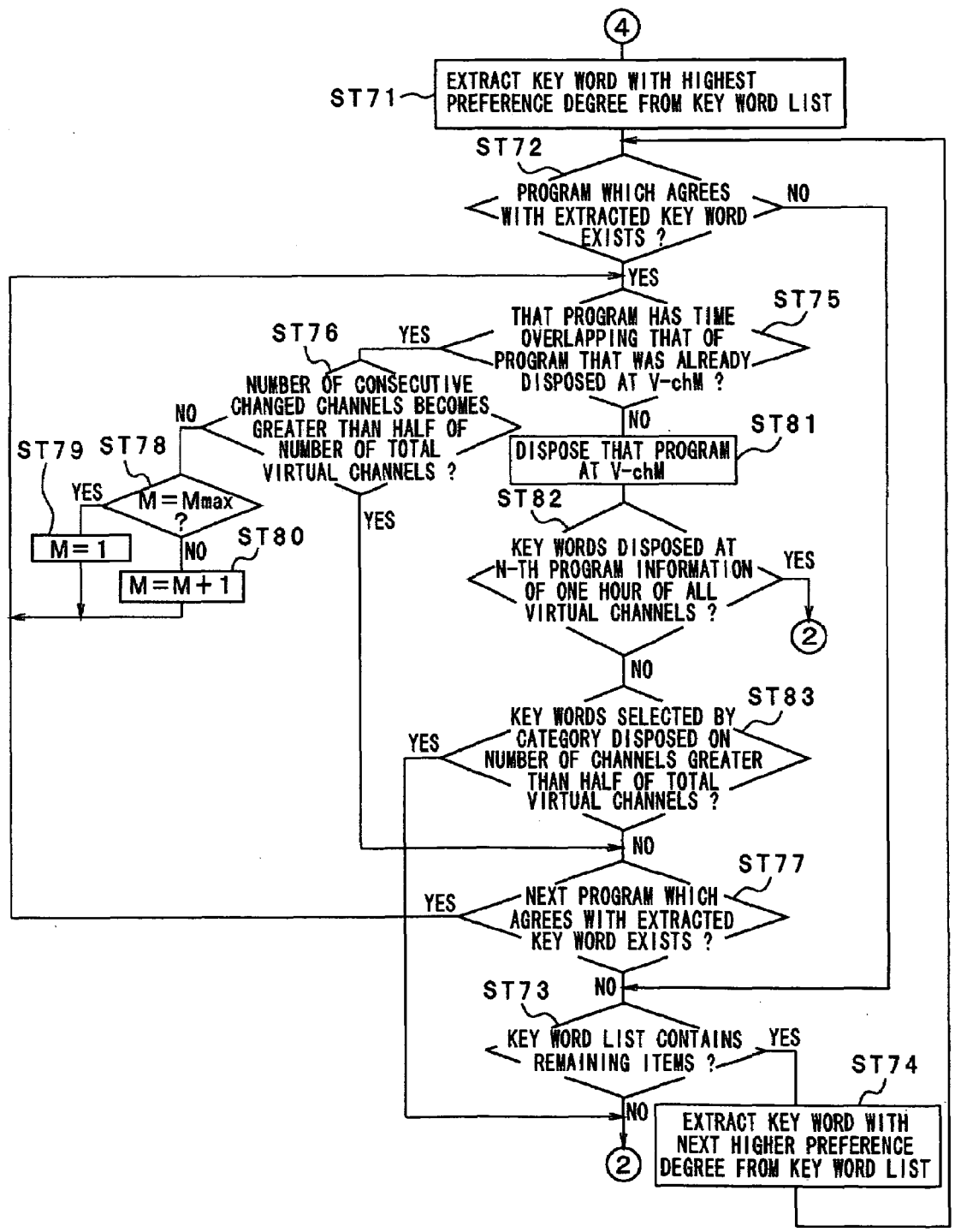

Next, at a step ST26, it may be determined whether or not the priority viewing list may contain programs which fall within the set time range. Although not shown, the priority viewing list may be created in advance by setting the priority program when a user may operate the key input section 102. If the priority viewing list contains the programs which may fall within the set time range, then at a step ST27, such program may be located at a virtual channel V-ch1. Control goes to a step ST28 (FIG. 10B). If on the other hand the priority viewing list may not contain the programs which may fall within the set time range, then control immediately goes to a step ST28. At the step ST28, M, N may be set to 1, respectively.

Next, at a step ST29, the N-th program information of one hour which may fall within the set time range may be extracted from program information IPG that was extracted at the program information extracting section 106. Then, at a step ST30, it may be determined whether or not there may exist the synthesized user profile information of the corresponding unit time. If there may not exist the synthesized user profile information, then at a step ST31, whereat it may be determined whether or not N may be Nmax. Nmax may be the maximum value of N. If N=Nmax may not be satisfied, then at a step ST32, whereat N may be incremented by 1. Then, control goes back to the step ST29, whereat the similar operation mentioned above may be executed.

If on the other hand N=Nmax may be satisfied, then this means that the operation for creating the virtual channel within the set time range may be ended. Then, control goes to a step ST33. At the step ST33, the program of such virtual channel may be displayed on the monitor apparatus 110 by supplying display data of virtual channel to the OSD circuit 112. Then, at a step ST34, the operation for creating a virtual channel may be ended.

Also, if there may exist the synthesized profile information at the step ST30, then control goes to a step ST35. At the step ST35, a title with a highest preference degree may be extracted from the title list. Then, at a step ST36, it may be determined whether or not there may exist a program which may agree with the extracted title. If there may not exist the program which may agree with the extracted title, then control goes to a step ST37, whereat it may be determined whether or not the title list may contain remaining items. If the title list may contain the remaining items, then at a step ST38, a title with a next higher preference degree may be extracted from the title list, and then control goes back to the step ST36, whereat the similar operation mentioned above may be executed.

Also, at the step ST36, if there may exist the program which may agree with the extracted title, then at a step ST39, whereat it may be determined whether or not the time of that program may overlap that of the program that was already located at the virtual channel V-chM. If the time overlap the time, then at a step ST40, whereat it may be determined in order to avoid the overlapping of the time whether or not the consecutive channel changing number may become greater than the half of the total virtual channel number. If the channel changing number may become greater than the total virtual channel number, then it may give up to locate the program selected at the step ST36 in the virtual channel. Then, control goes to a step ST37, whereat a new program may be selected.

If on the other hand the channel changing number may not be greater than the half of the total virtual channel number, then at a step ST40, whereat there may be changed the virtual channel in which the program selected may be located. Specifically, it may be determined at a step ST41 whether or not M=Mmax may be satisfied. Mmax may represent the number of virtual channels that may be created. If M=Mmax may be satisfied, then at a step ST42, M=1 may be satisfied, and then control goes back to the step ST39. If on the other hand M=Mmax may not be satisfied, then at a step ST43, whereat M may be incremented by one. Then, control goes back to the step ST39.

Also, if it may be determined at the step ST39 that the time may not overlap the time, then at a step ST44, that program may be located at the virtual channel V-chM. Then, control goes to a step ST45. At the step ST45, it may be determined whether or not the program may be located at the N-th virtual channel of one hour of all virtual channels. If the program may be located at that virtual channel, then this may mean that the creation of the N-th virtual channel of one hour may be completed. Then, in order for control to goes to the operation in which the next virtual channel of one hour may be created, control goes back to the step ST31.

If it may be determined at the step ST45 that the program may not be located at such virtual channel, then control goes to a step ST46. At the step ST46, it may be determined whether or not the programs selected according to the titles may be located at the virtual channels which may be greater than the half of the total virtual channels. If not, then control goes back to the step ST37, whereat the next title may be selected. If on the other hand the programs may be located, then control goes to a step ST51 (FIG. 10C), whereat program may be selected based on the categories. If it may be determined at the above-mentioned step ST37 that the title list may not contain the remaining items, then control goes to the step ST51.

At the step ST51, a category with a highest preference degree may be extracted from the category list. Then, at a step ST52, it may be determined whether or not there may exist programs (excepting the programs that have been already located at the virtual channels) which may agree with the extracted category. If there may not exist programs which may agree with the extracted category, then control goes to a step ST53, whereat it may be determined whether or not the category list may contain remaining items. If the category list may contain remaining items, then at a step ST54, the next category with a higher preference degree may be extracted from the category list, and then control goes back to the step ST52, whereat the above-mentioned similar operation may be executed.

Also, if it may be determined at the step ST52 that there may exist programs which may agree with the extracted category, then at a step ST55, it may be determined whether nor not the time of such program may overlap with that of the program that has already been located at the virtual channel VchM. If the time may overlap the time, then at a step ST56, it may be determined in order to avoid the overlapping of time whether or not the consecutive channel changing number may become greater than the half of the total virtual channels. If the channel changing number may become greater than the half of the total virtual channels, then at a step ST56, it may give up to locate the program selected in the step ST52 at the virtual channel. Then, control goes to a step ST57.

It may be determined at the step ST57 whether or not there may exist the next program which may agree with the extracted category. If there may exist the next program which may agree with the extracted category, then control goes back to the step ST55, whereat the above-mentioned similar operation may be executed. If on the other hand there may not exist the next program, then control goes to the above-mentioned step ST53, whereat a new category may be selected.

If it may be determined at the step ST56 that the channel changing number may not become greater than the half of the total virtual channels, then at the step ST56, there may be changed a virtual channel in which the selected program will be located. Specifically, at a step ST58, it may be determined whether or not M=Mmax may be satisfied. If M=Mmax may be satisfied, then at a step ST59, M=1 may be established, and then control goes back to the step ST55. If on the other hand M=Mmax may not be satisfied, then at a step ST60, M may be incremented by 1, and control goes back to the step ST55.

Also, if it may be determined at the step ST55 that the time may not overlap the time, then at a step ST61, that program may be located at the virtual channel V-chM, and then control goes to a step ST62. At the step ST62, it may be determined whether or not the program may be located at the N-th virtual channel of one hour of all virtual channels. If the program may be located at that virtual channel, then this mean that the creation of the N-th virtual channel of one hour was completed. Then, control goes back to the step ST31 (FIG. 10B), whereat the next virtual channel of one hour may be created.

If it may be determined at the step ST62 that the program may not be located at that virtual channel, then control goes to a step ST63. It may be determined at the step ST63 whether or not programs selected according to the category may be located at the virtual channels which may be greater than the half of the total virtual channels. If not, then control goes to a step ST57, whereat the next program will be selected. If it may be determined that the program may be located at the virtual channel, control goes to a step ST71 (FIG. 10D), whereat programs will be selected based on the key word. If it may be determined at the above-mentioned step ST53 that the category list may not contain the remaining items, then control goes to the step ST71.

At the step ST71, a key word with a highest preference degree may be extracted from the category list. Then, at a step ST72, it may be determined whether or not there may exist programs (excepting the programs that have been already located at the virtual channel) which may agree with the extracted key word. If there may not exist programs which may agree with the extracted key word, then control goes to a step ST73, whereat it may be determined whether or not the key word list may contain remaining items. If it may be determined that the key word list may contain remaining items, then at a step ST74, the next key word with a higher preference degree may be extracted from the key word list. Then, control goes back to the step ST72, whereat the above-mentioned similar operation may be executed.

Also, if there may exist a program which may agree with the key word thus extracted, then at a step ST75, it may be determined whether or not the time of that program may overlap with that of the program which had already been located the virtual channel V-chM. If the time may overlap the time, then at a step ST76, it may be determined in order to avoid the overlapping of time whether or not the consecutive channel changing number may become greater than the half of total virtual channel number. If the channel changing number may become greater than the half of the total virtual channel number, then at a step ST76, it may give up to locate the selected program at the virtual channel. Then, control goes to a step ST77.

It may be determined at the step ST77 whether or not there may exist the next program which may agree with the extracted key word. If there may exist the next program, then control goes back to the step ST75, whereat the above-mentioned similar operation may be executed. If on the other hand there may not exist the next program, then control goes to the above-mentioned step ST73, whereat a new key word will be selected.

If it may be determined at the step ST76 that the channel changing number may not become the half of the total virtual channel number, then at the step ST76, there may be changed a virtual channel in which the selected program may be located. Specifically, it may be determined at a step ST78 whether or not M=Mmax may be satisfied. If M=Mmax may be satisfied, then at a step ST79, M=1 may be satisfied. Then, control goes back to the step ST75. If on the other hand M=Mmax may not be satisfied, then control goes to a step ST80, whereat M may be incremented by 1. Control goes back to the step ST75.

Also, if it may be determined that the time may not overlap the time, then control goes to a step ST81, whereat that program may be located at the virtual channel of V-chM. Then, control goes to a step ST82. At the step ST82, it may be determined whether or not the program may be located at the N-th virtual program of one hour of all virtual channel. If the program may be located at such virtual program, then this means that the creation of the N-th virtual channel of one hour was completed. Then, control goes back to the step ST31 (FIG. 11), whereat the next virtual channel of one hour will be created.

If the program may not be located at such virtual program, then control goes to a step ST83. At the step ST83, it may be determined whether or not programs selected by the key word may be located at the virtual channels which may become greater than the half of the total virtual channels. If it may be determined that the programs may not be located, then control goes to a step ST77, whereat the next program will be selected. If on the other hand the programs may be located, then this means that the creation of the N-th virtual channel of one hour was completed. Then, control goes back to the step ST31 (FIG. 11), whereat the next virtual channel of one hour will be created. If it may be determined at the above-mentioned step ST73 that the key word list may not contain the remaining items, then control goes to the step ST31.

FIG. 13 shows an example of the manner in which virtual channels may be created. In this example, a time range may be set in a range of from 20 to 00 and in which six virtual channels V-ch1 to V-ch6 may be arranged by selectively locating programs of real channels of the channels CHa to CHh shown in FIG. 12. Incidentally, "MOVIE 2" of the real channel CHg and "NEWS 4" of the real channel CHe are programs which were previously set on the priority viewing list, and these programs may be located at the virtual channel V-Ch1.

As set forth above, according to this embodiment, there may be created the user profile in which information of programs received at every unit time may be accumulated as the user profile information. Then, on the basis of such user profile, there may be created the virtual channel in which programs of a plurality of real channels may be located selectively. This virtual channel may be the channel in which the programs corresponding to the user viewing pattern may be located. Therefore, if a user may select this virtual channel, then it becomes possible for a user to view or record the program corresponding to the viewing pattern without switching the channels. Thus, the receiver may become easier to handle.

Incidentally, while the weekday user profile may be created from the viewing history of programs viewed on weekdays and the holiday user profile may be created from the viewing history of programs viewed on holidays as the user profiles in the above-mentioned embodiment, the present invention is not limited thereto, and there may be created user profiles of days from Sunday to Saturday.

Also, control goes to the processing of the next one hour if there may not exist the synthesized user profile information of the corresponding unit time (see step ST30) in the virtual channel creating operation shown in FIGS. 10A to 10D in the above-mentioned embodiment. The present invention is not limited thereto, and synthesized user profile information that may be ahead of and behind the unit time may be used if the synthesized user profile of the corresponding unit time may not be available.

Also, while the programs may be searched in the sequential order of the title, the category and the key word in the virtual channel creating operation shown in FIGS. 10A to 10D in the above-mentioned embodiment, the sequential order may not be limited thereto, and may be arbitrarily set by a use operating the key input section 102, for example.

Also, while this invention is applied to the television receiver in the above-mentioned embodiment, the present invention is not limited thereto, and may of course be applied similarly to a receiving section of a recording apparatus such as a video tape recorder for recording a broadcast signal.

According to this invention, the virtual channel in which the programs of a plurality of real channels are located selectively may be created on the basis of the user profile in which information of programs received at every unit time were accumulated as the user profile information. Therefore, if a user may select the virtual channel, then the user can view or record the program corresponding to the viewing pattern without switching the channels. Thus, the receiver may become easier to handle.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A receiver comprising:
  receiving means for receiving a digital broadcast signal;
  selecting means for enabling a user to manually select real channel information corresponding to a number of programs from information of a plurality of real channels;
  program information extracting means for extracting program information of said plurality of real channels from said digital broadcast signal received by said receiving means;
  user profile creating means for creating on the basis of the selected real channel information from said selecting means and said program information extracted by said program information extracting means a user profile in which program information are accumulated as user profile information; and
  virtual channel guide creating means for creating a virtual channel guide in which programs are located by utilizing said user profile,
  wherein said virtual channel guide creating means locates a program into a virtual channel only when its corresponding time is not overlapped with any program located in said virtual channel, and shifts to a consecutive virtual channel when overlapped.

2. The receiver according to claim 1, further comprising display means for displaying said virtual channel guide created by said virtual channel guide creating means.

3. The receiver according to claim 1, further comprising time zone setting means for setting a time zone in which said virtual channel is created.

4. The receiver as claimed in claim 1, wherein said user profile creating means creates a user profile of every predetermined period and constantly holds user profiles of a constant number.

5. The receiver as claimed in claim 1, wherein said user profile creating means creates a weekday user profile from a viewing history of programs viewed on weekdays and creates a holiday user profile from a viewing history of programs viewed on holidays as said user profile.

6. The receiver as claimed in claim 1, wherein said user profile created by said user profile creating means accumulates at least a title, a category and a key word of programs received at every unit time.

7. The receiver as claimed in claim 1, wherein said virtual channel guide creating means uses user profiles located ahead of and behind said predetermined unit time if user profile information corresponding to said predetermined unit time is not accumulated then when a program of said real channel corresponding to a predetermined unit time is selected.

8. The receiver according to claim 1, further comprising channel control means for controlling said selecting means in a manner that said real channel selected from said virtual channel guide created by said virtual channel creating means are received sequentially.

9. The receiver as claimed in claim 1, further comprising:
  a priority program setting means for setting a priority program,
  wherein said virtual channel guide creating means gives priority to the priority program set by said priority program setting means in creating the virtual channel guide such that the priority program set by said priority program setting means is located into the virtual channel guide prior to other programs.

* * * * *